United States Patent
Sendo et al.

(10) Patent No.: US 11,326,491 B2
(45) Date of Patent: May 10, 2022

(54) HONEYCOMB FILTER

(71) Applicant: NGK Insulators, Ltd., Nagoya (JP)

(72) Inventors: Koichi Sendo, Nagoya (JP); Yu Torii, Nagoya (JP); Shuji Ueda, Nagoya (JP); Shungo Nagai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 17/147,741

(22) Filed: Jan. 13, 2021

(65) Prior Publication Data

US 2021/0270161 A1    Sep. 2, 2021

(30) Foreign Application Priority Data

Mar. 2, 2020    (JP) .............. JP2020-034883

(51) Int. Cl.
*F01N 3/022* (2006.01)
*B01J 35/04* (2006.01)
*C04B 38/00* (2006.01)

(52) U.S. Cl.
CPC ............ *F01N 3/0222* (2013.01); *B01J 35/04* (2013.01); *C04B 38/0009* (2013.01); *B01D 2201/62* (2013.01); *B01D 2255/9205* (2013.01)

(58) Field of Classification Search
None
See application file for complete search history.

(56) References Cited

U.S. PATENT DOCUMENTS

| | | |
|---|---|---|
| 2003/0137071 A1 | 7/2003 | Noguchi et al. |
| 2004/0051196 A1 | 3/2004 | Otsuka et al. |
| 2009/0011919 A1* | 1/2009 | Noguchi ............... C04B 35/195 501/80 |
| 2015/0251124 A1 | 9/2015 | Okazaki |
| 2018/0214810 A1* | 8/2018 | Iida ..................... C04B 38/0009 |

FOREIGN PATENT DOCUMENTS

| | | |
|---|---|---|
| EP | 1 842 578 A2 | 10/2007 |
| JP | 2002-326879 A1 | 11/2002 |
| JP | 2003-238271 A1 | 8/2003 |

OTHER PUBLICATIONS

German Office Action (Application No. 10 2021 000 166.4) dated Apr. 27, 2021 (with English translation).

* cited by examiner

*Primary Examiner* — Mary I Omori
(74) *Attorney, Agent, or Firm* — Burr & Brown, PLLC

(57) ABSTRACT

A honeycomb filter includes a pillar-shaped honeycomb structure body having a porous partition wall disposed to surround a plurality of cells and a plugging portion provided at an open end on a first end face side or a second end face side of each of the cells, wherein the partition wall is composed of a material containing cordierite as a main component thereof, a number per unit area of pores which exist at a surface of the partition wall and which have equivalent circle diameters exceeding 3.0 μm is 1400 per $mm^2$ or more, and, in a pore diameter distribution which indicates a cumulative pore volume of the partition wall, with a log pore diameter on a horizontal axis and a log differential pore volume ($cm^3/g$) on a vertical axis, a half-value width of a first peak that includes a maximum value of the log differential pore volume is 0.30 or less.

2 Claims, 3 Drawing Sheets

HONEYCOMB FILTER

The present application is an application based on JP 2020-034883 filed on Mar. 2, 2020 with Japan Patent Office, the entire contents of which are incorporated herein by reference.

BACKGROUND OF THE INVENTION

Field of the Invention

The present invention relates to a honeycomb filter. More specifically, the present invention relates to a honeycomb filter that has high filtration efficiency and suppresses an increase in pressure loss.

Description of the Related Art

Hitherto, as a filter adapted to trap particulate matter in an exhaust gas emitted from an internal combustion engine, such as an automobile engine, there has been known a honeycomb filter that uses a honeycomb structure. The honeycomb structure has a porous partition wall composed of cordierite or the like, and a plurality of cells are defined by the partition wall. In the honeycomb filter, the foregoing honeycomb structure is provided with, for example, plugging portions that alternately plug the open ends on the inflow end face side of the plurality of cells and the open ends on the outflow end face side thereof. In the honeycomb filter, the porous partition wall functions as a filter that traps the particulate matter in an exhaust gas.

The honeycomb structure can be manufactured by adding a pore former, a binder and the like to a ceramic raw material powder to prepare a plastic kneaded material, forming the obtained kneaded material into a predetermined shape to obtain a formed body, and firing the obtained formed body (refer to, for example, Patent Documents 1 and 2). As a ceramic raw material powder, a cordierite forming raw material or the like is known.

[Patent Document 1] JP-A-2002-326879
[Patent Document 2] JP-A-2003-238271

According to the conventional manufacturing methods of a honeycomb filter, a method has been tried, in which, at the time of manufacturing a honeycomb structure, the particle size of a cordierite forming raw material is not controlled, and hollow resin particles of a foamable resin or the like, or water-swellable particles of crosslinked starch or the like are used for pore formers. However, it has been impossible to manufacture honeycomb filters that satisfy current exhaust gas regulations by such a conventional manufacturing method.

SUMMARY OF THE INVENTION

The present invention has been made in view of the problems with the prior arts described above. The present invention provides a honeycomb filter that has high filtration efficiency and suppresses an increase in pressure loss.

According to the present invention, a honeycomb filter described below is provided.

According to a first aspect of the present invention, a honeycomb filter is provided including:

a pillar-shaped honeycomb structure body having a porous partition wall disposed to surround a plurality of cells which serve as fluid through channels extending from a first end face to a second end face; and a plugging portion provided at an open end on the first end face side or the second end face side of each of the cells, wherein the partition wall is composed of a material containing cordierite as a main component thereof, a number per unit area of pores which exist at a surface of the partition wall and which have equivalent circle diameters exceeding 3.0 μm is 1400 per $mm^2$ or more, and, in a pore diameter distribution which indicates a cumulative pore volume of the partition wall, with a log pore diameter on a horizontal axis and a log differential pore volume ($cm^3/g$) on a vertical axis, a half-value width of a first peak that includes a maximum value of the log differential pore volume is 0.30 or less.

According to a second aspect of the present invention, the honeycomb filter described in the foregoing first aspect is provided, wherein a porosity of the partition wall is 45 to 65%.

According to a third aspect of the present invention, the honeycomb filter described in the foregoing first or second aspects is provided, wherein an average pore diameter of the partition wall is 5 to 15 μm.

According to a fourth aspect of the present invention, the honeycomb filter described in any one of the foregoing first to third aspects is provided, wherein the thickness of the partition wall is 152 to 254 μm.

The honeycomb filter in accordance with the present invention provides an effect of enabling high filtration efficiency and suppression of an increase in pressure loss.

DESCRIPTION OF THE PREFERRED EMBODIMENTS

The following will describe embodiments of the present invention; however, the present invention is not limited to the following embodiments. Therefore, it should be understood that those created by adding changes, improvements or the like to the following embodiments, as appropriate, on the basis of the common knowledge of one skilled in the art without departing from the spirit of the present invention are also covered by the scope of the present invention.

(1) Honeycomb Filter

Figure 1:
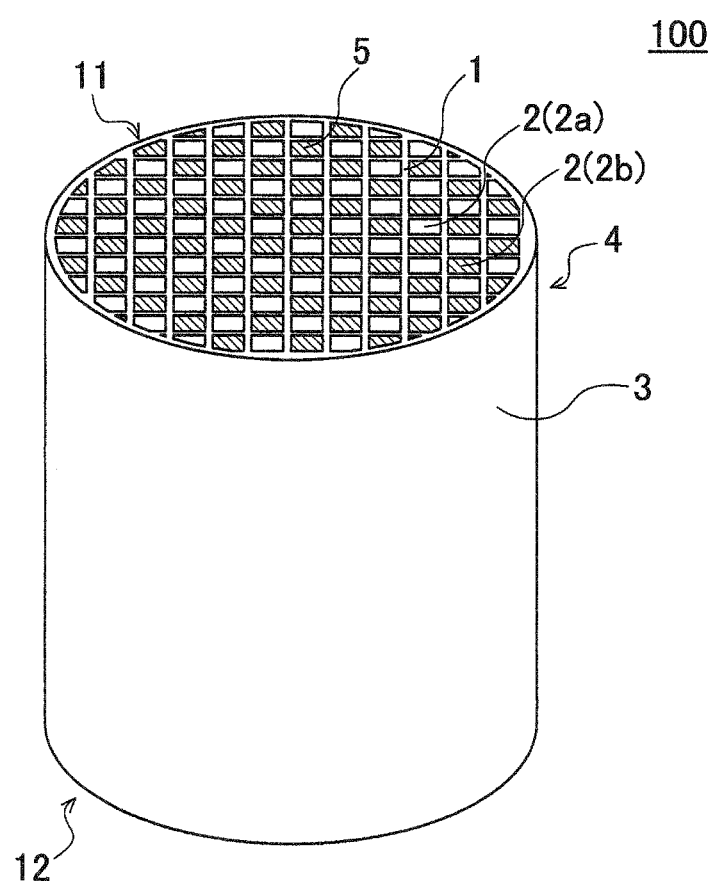
FIG. 1 is a perspective view schematically showing an embodiment of a honeycomb filter in accordance with the present invention viewed from an inflow end face side.
Figure 2:
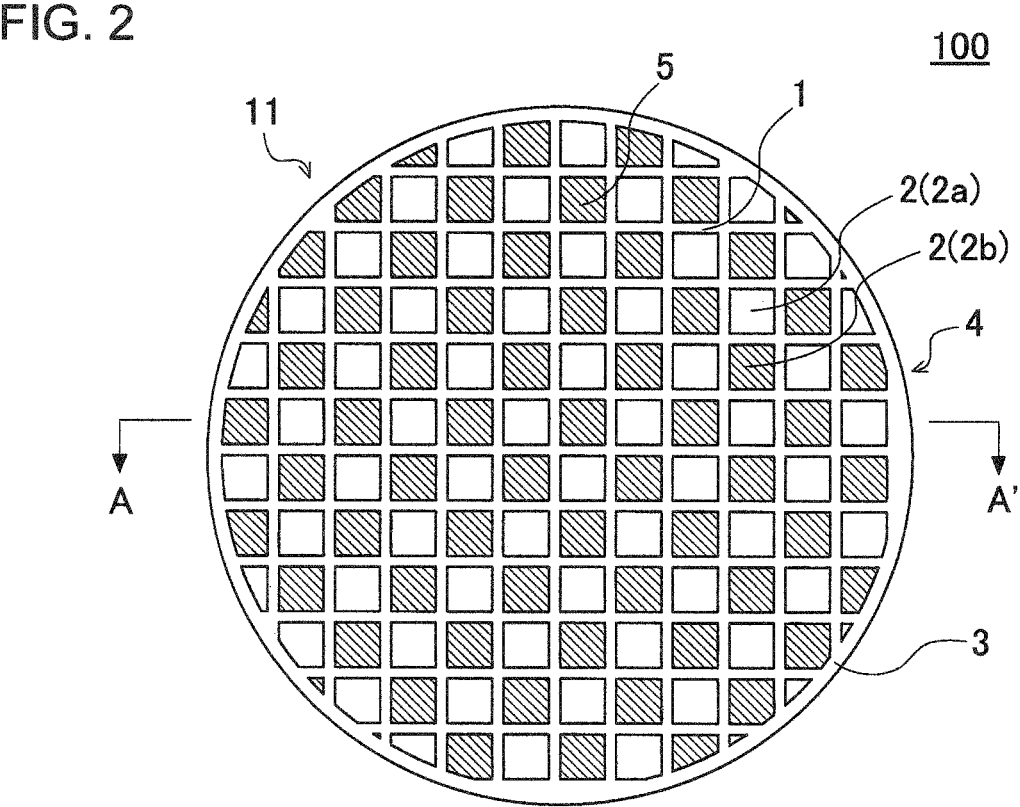
FIG. 2 is a plan view of the honeycomb filter shown in FIG. 1 viewed from the inflow end face side.
Figure 3:
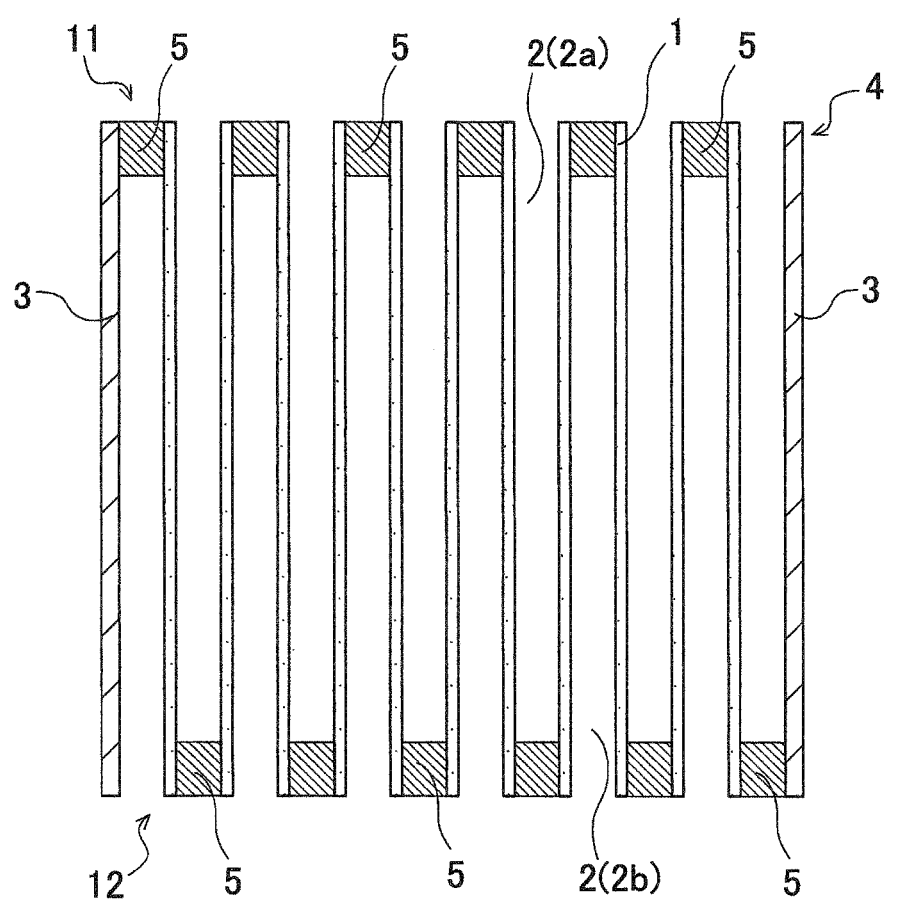
FIG. 3 is a sectional view schematically showing a section A-A' of FIG. 2.

As shown in FIG. 1 to FIG. 3, a first embodiment of the honeycomb filter in accordance with the present invention is a honeycomb filter 100 that includes a honeycomb structure body 4 and plugging portions 5. The honeycomb structure body 4 is a pillar-shaped structure having a porous partition wall 1 disposed to surround a plurality of cells 2 that serve as fluid through channels extending from a first end face 11 to a second end face 12. In the honeycomb filter 100, the honeycomb structure body 4 is pillar-shaped and further includes an outer circumferential wall 3 on the outer circumferential side face. In other words, the outer circumferential wall 3 is provided to encompass the partition wall 1 provided in a grid pattern. The plugging portions 5 are provided at open ends on the first end face 11 side or the second end face 12 side of each of the cells 2.

FIG. 1 is a perspective view schematically showing an embodiment of the honeycomb filter in accordance with the present invention viewed from an inflow end face side. FIG. 2 is a plan view of the honeycomb filter shown in FIG. 1, viewed from the inflow end face side. FIG. 3 is a sectional view schematically showing a section A-A' of FIG. 2.

In the honeycomb filter 100, the partition wall 1 constituting the honeycomb structure body 4 is configured as described below. First, the partition wall 1 is composed of a material that contains cordierite as the main component thereof. The partition wall 1 is preferably composed of cordierite except for components that are inevitably contained.

In the partition wall 1 constituting the honeycomb structure body 4, the number of pores, which exist at the surface of the partition wall 1 and which have equivalent circle diameters exceeding 3.0 μm, per unit area (specifically, per mm$^2$) is 1400 per mm$^2$ or more. Hereinafter, "the number per mm$^2$ of pores which exist at the surface of the partition wall 1 and which have equivalent circle diameter exceeding 3.0 μm" may be referred to as "the number of pores (pores/per mm$^2$)" of the surface of the partition wall 1. If the number of pores of the surface of the partition wall 1 is below 1400 per mm$^2$, then it would be difficult to achieve both improvement of filtration efficiency and suppression of an increase in pressure loss. There is no particular restriction on an upper limit value of the number of pores of the surface of the partition wall 1, but the number is preferably, for example, 10000 per mm$^2$ or less. The number of pores of the surface of the partition wall 1 is more preferably 1400 to 5000 per mm$^2$ and furthermore preferably 1400 to 3000 per mm$^2$.

The number of pores (pores/mm$^2$) of the surface of the partition wall 1 can be measured by the following method. First, a sample for measurement is cut out from the honeycomb structure body 4 so as to make it possible to observe the surface of the partition wall 1 of the honeycomb structure body 4. Then, the surface of the partition wall 1 of the sample for measurement is photographed by a laser microscope. The laser microscope that can be used is, for example, a shape analysis laser microscope of "VK X250/260 (trade name)" manufactured by KEYENCE Corporation. In photographing the surface of the partition wall 1, the magnification is set to 240 times, and arbitrary places of 10 fields of view are photographed. Image processing of the captured images is performed, and the number of pores of the surface of the partition wall 1 is calculated. In the image processing, an area is selected such that no portion of the partition wall 1 except the surface of the partition wall 1 is included in the area to be subjected to the image processing, and the inclination of the surface of the partition wall 1 is corrected to be horizontal. Thereafter, the upper limit of the height for being recognized as pores is changed to −3.0 μm from a reference surface. Under a condition that pores having equivalent circle diameters of 3.0 μm or less are ignored, the number of pores of the captured image is calculated using image processing software. The equivalent circle diameter (μm) of the pores of the surface of the partition wall 1 can be calculated by measuring an opening area S of each pore and applying an equation of the equivalent circle diameter=$\sqrt{\{4\times(\text{area S})/\pi\}}$ with respect to the area S that has been measured. The value of the number of pores (pores/mm$^2$) of the surface of the partition wall 1 is to be an average value of the measurement results of the 10 fields of view. The image processing software that can be used is, for example, "VK-X (trade name)" included with the shape analysis laser microscope of "VK X250/260 (trade name)" manufactured by KEYENCE Corporation. The measurement of the equivalent circle diameter of each pore and the image analysis ignoring pores that have predetermined equivalent circle diameters can be performed using the image processing software described above.

Further, the honeycomb filter 100 has a first peak configured as described below in a pore diameter distribution which indicates a cumulative pore volume of the partition wall 1, with a log pore diameter on a horizontal axis and a log differential pore volume (cm$^3$/g) on a vertical axis. The "first peak" is a peak that includes the maximum value of the log differential pore volume in the pore diameter distribution. Further, the half-value width of the first peak is 0.30 or less. The "half-value width of the first peak" means the value of a pore diameter corresponding to a ½ value width of the maximum value of the log differential pore volume of the first peak. Hereinafter, "the value of a pore diameter corresponding to the ½ value width of the maximum value of the log differential pore volume of the first peak" may be referred to simply as "the half-value width of the first peak."

If the half-value width of the first peak is 0.30 or less, then the first peak will be sharp in the pore diameter distribution of the partition wall 1, thus making it possible to decrease a large pore volume ratio due to pores having relatively large pore diameters and a small pore volume ratio due to pores having relatively small pore diameters. Consequently, both improved trapping performance of the honeycomb filter 100 and reduced pressure loss can be achieved. If the half-value width of the first peak exceeds 0.30, then the first peak becomes wide (broad), making it difficult to achieve the two effects described above. There is no particular restriction on the lower limit value of the half-value width of the first peak, but the lower limit value is, for example, approximately 0.05. Accordingly, the half-value width of the first peak is preferably 0.05 to 0.30, and more preferably 0.05 to 0.25.

The cumulative pore volume of the partition wall 1 is indicated by a value measured by a mercury press-in method. The measurement of the cumulative pore volume of the partition wall 1 can be performed using, for example, Autopore IV (trade name) manufactured by Micromeritics. The measurement of the cumulative pore volume of the partition wall 1 can be performed by the following method. First, a part of the partition wall 1 is cut out from the honeycomb filter 100 to make a test piece for measuring the cumulative pore volume. There is no particular restriction on the size of the test piece, but the test piece is preferably, for example, a rectangular parallelepiped having a length, a width, and a height of approximately 10 mm, approximately 10 mm, and approximately 20 mm, respectively. There is no particular restriction on a portion of the partition wall 1 from which the test piece is cut out, but the test piece is preferably made by cutting from the vicinity of the center of the honeycomb structure body in the axial direction. The obtained test piece is placed in a measurement cell of a measurement device, and the interior of the measurement cell is decompressed. Next, mercury is introduced into the measurement cell. Next, the mercury that has been introduced into the measurement cell is pressurized, and the volume of the mercury pushed into the pores existing in the test piece is measured during the pressurization. At this time, as the pressure applied to the mercury is increased, the mercury is pushed into the pores progressively from pores having larger pore diameters and then to pores having smaller pore diameters. Consequently, the relationship between "the pore diameters of the pores formed in the test piece" and "the cumulative pore volume" can be determined from the relationship between "the pressure applied to the mercury" and "the volume of the mercury pushed into the pores." More specifically, when the pressure is gradually applied to intrude the mercury into the pores of the sample in the container hermetically sealed to a vacuum state by the mercury press-in method as described above, the mercury under the pressure intrudes into the larger pores and then into the smaller pores of the sample. Based on the pressure and the amount of mercury intruded at that time, the pore diameters of the pores formed in the sample and the volumes of the pores can be calculated. Hereinafter, when the pore diameters are denoted by D1, D2, D3 . . . , the relationship of D1>D2>D3 . . . is to be satisfied. In this case, an average pore diameter D between measurement points (e.g., from D1 to D2) can be indicated on the horizontal axis by "the average pore diameter D=(D1+D2)/2." Further, the Log differential pore volume on the vertical axis can be indicated by a value obtained by dividing an increment dV of the pore volume between measurement points by a difference value treated as the logarithms of the pore diameters (i.e., "log (D1)–log(D2)." In a graph showing such a pore diameter distribution, a peak means a turning point indicated by the distribution, and a peak that includes the maximum value of the log differential pore volume is defined as the first peak. The "cumulative pore volume" refers to, for example, a value obtained by accumulating the pore volumes from a maximum pore diameter to a particular pore diameter.

In the honeycomb filter 100, the thickness of the partition wall 1 is preferably 152 to 254 µm, and more preferably 203 to 254 µm. A thickness of the partition wall 1 that is below 152 µm is not desirable in terms of strength. A thickness of the partition wall 1 that exceeds 254 µm is not desirable in terms of pressure loss.

The cell density of the honeycomb structure body 4 is preferably, for example, 23 to 62 cells/cm$^2$, and more preferably 27 to 47 cells/cm$^2$.

The porosity of the partition wall 1 of the honeycomb structure body 4 is preferably, for example, 45 to 65%, and more preferably 55 to 63%. The porosity of the partition wall 1 is based on values measured by the mercury press-in method, and can be measured using, for example, Autopore IV (trade name) manufactured by Micromeritics. To measure the porosity, a part of the partition wall 1 is cut out as a test piece from the honeycomb filter 100, and the obtained test piece can be used for the measurement.

The average pore diameter of the partition wall 1 of the honeycomb structure body 4 is preferably, for example, 5 to 20 µm, and more preferably 5 to 15 µm. The average pore diameter of the partition wall 1 is based on values measured by the mercury press-in method, and can be measured using, for example, Autopore IV (trade name) manufactured by Micromeritics.

There is no particular restriction on the shapes of the cells 2 formed in the honeycomb structure body 4. For example, the shapes of the cells 2 in the section that is orthogonal to the extending direction of the cells 2 may be polygonal, circular, elliptical or the like. A polygonal shape may be triangular, quadrangular, pentagonal, hexagonal, octagonal or the like. The shapes of the cells 2 are preferably triangular, quadrangular, pentagonal, hexagonal or octagonal. Further, regarding the shapes of the cells 2, all the cells 2 may have the same shape or different shapes. For example, although not shown, quadrangular cells and octagonal cells may be mixed. Further, regarding the sizes of the cells 2, all the cells 2 may have the same size or different sizes. For example, although not shown, among the plurality of cells, some cells may be made larger and the other cells may be made relatively smaller. In the present invention, the cells 2 mean the spaces surrounded by the partition wall 1.

The circumferential wall 3 of the honeycomb structure body 4 may be configured integrally with the partition wall 1 or may be composed of a circumferential coat layer formed by applying a circumferential coating material to the circumferential side of the partition wall 1. For example, although not shown, the circumferential coat layer can be provided on the circumferential side of the partition wall after the partition wall and the circumferential wall are integrally formed and then the formed circumferential wall is removed by a publicly known method, such as grinding, in a manufacturing process.

There is no particular restriction on the shape of the honeycomb structure body 4. The honeycomb structure body 4 may be pillar-shaped, the shapes of the first end face 11 (e.g., the inflow end face) and the second end face 12 (e.g., the outflow end face) being circular, elliptical, polygonal or the like.

There is no particular restriction on the size of the honeycomb structure body 4, e.g. the length from the first end face 11 to the second end face 12, and the size of the section that is orthogonal to the extending direction of the cells 2 of the honeycomb structure body 4. Each size may be selected as appropriate such that optimum purification performance is obtained when the honeycomb filter 100 is used as a filter for purifying exhaust gas.

In the honeycomb filter 100, the plugging portions 5 are provided at the open ends on the first end face 11 side of predetermined cells 2 and at the open ends on the second end face 12 side of the remaining cells 2. If the first end face 11 is defined as the inflow end face, and the second end face 12 is defined as the outflow end face, then the cells 2 which have the plugging portions 5 placed at the open ends on the outflow end face side and which have the inflow end face side open are defined as inflow cells 2a. Further, the cells 2 which have the plugging portions 5 placed at the open ends on the inflow end face side and which have the outflow end face side open are defined as outflow cells 2b. The inflow cells 2a and the outflow cells 2b are preferably arranged alternately with the partition wall 1 therebetween. This, in addition, preferably forms a checkerboard pattern by the plugging portions 5 and "the open ends of the cells 2" on both end faces of the honeycomb filter 100.

The material of the plugging portions 5 is preferably a material that is preferred as the material of the partition wall 1. The material of the plugging portions 5 and the material of the partition wall 1 may be the same or different.

The honeycomb filter 100 may have the partition wall 1, which defines the plurality of cells 2, loaded with a catalyst. Loading the partition wall 1 with a catalyst refers to coating the catalyst onto the surface of the partition wall 1 and the inner walls of the pores formed in the partition wall 1. This configuration makes it possible to turn CO, $NO_x$, HC and the like in exhaust gas into harmless substances by catalytic reaction. In addition, the oxidation of PM of trapped soot or the like can be accelerated.

(2) Manufacturing Method of the Honeycomb Filter

There is no particular restriction on the manufacturing method of the honeycomb filter of the present embodiment, and the manufacturing method can be one that includes, for example, a kneaded material preparation process, a forming process, and a firing process, as described below.

The kneaded material preparation process is a process for preparing a plastic kneaded material by adding an organic pore former and a dispersing medium to a cordierite forming raw material. The forming process is a process for forming the kneaded material, which has been obtained by the kneaded material preparation process, into a honeycomb shape to make a honeycomb formed body. The firing process is a process for firing the honeycomb formed body, which has been obtained in the forming process, to obtain a honeycomb filter. The following will describe in more detail each process in the manufacturing method of the honeycomb filter.

(2-1) Kneaded Material Preparation Process

In the kneaded material preparation process, first, the cordierite forming raw material, the organic pore former, and the dispersing medium, which are the raw materials of the kneaded material, are prepared. The "cordierite forming raw material" is a ceramic raw material blended so as to have a chemical composition in which silica is in the range of 42 to 56% by mass, alumina is in the range of 30 to 45% by mass, and magnesia is in the range of 12 to 16% by mass, and the ceramic raw material is fired to become cordierite.

In the kneaded material preparation process, a cordierite forming raw material that contains porous silica is preferably used. The porous silica is a silicon source of a silica composition in the cordierite forming raw material, and functions also as an inorganic pore former. The porous silica preferably has a BET specific surface area of 100 to 500 $m^2/g$, and more preferably 200 to 400 $m^2/g$, as measured according to, for example, JIS-R1626.

For the cordierite forming raw material, in addition to the foregoing porous silica, a plurality of types of raw materials that become a magnesium source, a silicon source, and an aluminum source can be mixed and used so as to have a chemical composition of cordierite. Examples of the cordierite forming raw material include talc, kaolin, alumina, aluminum hydroxide, boehmite, crystalline silica, fused silica, and dickite.

In the kneaded material preparation process, a cordierite forming raw material having the particle size thereof adjusted as described below is used. In the cumulative particle size distribution of the cordierite forming raw material based on volume, a particle diameter of 10% by volume of the total volume from a small diameter side is denoted by $D_{(a)}$ 10, a particle diameter of 50% by volume of the total volume from a small diameter side is denoted by $D_{(a)}$ 50, and a particle diameter of 90% by volume of the total volume from a small diameter side is denoted by $D_{(a)}$ 90. The unit of each of $D_{(a)}$ 10, $D_{(a)}$ 50, and $D_{(a)}$ 90 is "µm." The cumulative particle size distribution of the cordierite forming raw material is to be based on values measured by a laser diffraction/scattering type particle size distribution measurement method. In the kneaded material preparation step, a cordierite forming raw material that satisfies the relationship of the following expression (1) is preferably used.

$$D_{(a)} 50/(D_{(a)} 90 - D_{(a)} 10) \geq 0.50 \quad \text{Expression (1)}$$

$$|\log_{10} D_{(a)} 50 - \log_{10} D_{(b)} 50| \leq 0.50 \quad \text{Expression (2)}$$

Further, in the kneaded material preparation process, an organic pore former having the particle size thereof adjusted as described below is preferably used. In the cumulative particle size distribution of the organic pore former based on volume, a particle diameter of 50% by volume of the total volume from the small diameter side is denoted by $D_{(b)}$ 50. The unit of $D_{(b)}$ 50 is "µm." The cumulative particle size distribution of the organic pore former is to be based also on values measured by the laser diffraction/scattering type particle size distribution measurement method. In the kneaded material preparation process, a cordierite forming raw material and an organic pore former that satisfy the relationship of the expression (2) given above are preferably used. In the expression (2), "$\log_{10} D_{(a)}$ 50" and "$\log_{10} D_{(b)}$ 50" denote logarithms with base 10. The left side of the expression (2) indicates an absolute value of a difference between "$\log_{10} D_{(a)}$ 50" and "$\log_{10} D_{(b)}$ 50." Hereinafter, unless otherwise specified, the unit of the particle diameters of raw materials used in the kneaded material preparation process will be "µm." Further, in various types of raw materials used as raw materials, when simply referring to "D50," it means a particle diameter (µm) of 50% by volume of a total volume from the small diameter side in the cumulative particle size distribution of the raw material. In other words, "D50" means a median diameter.

The honeycomb filter of the present embodiment can be successfully manufactured by manufacturing a honeycomb filter by using the kneaded material prepared with a cordierite forming raw material and an organic pore former that satisfy the relationships of the expression (1) and the expression (2) given above. More specifically, the number per unit area of pores which exist at the surface of the partition wall and which have equivalent circle diameters exceeding 3.0 µm can be set to 1400 per $mm^2$ or more and the half-value width of the first peak in the pore diameter distribution can be set to 0.30 or less.

The organic pore former is a pore former that contains carbon as a raw material, any such pore former may be used insofar as it has a property of being dispersed and lost by firing in the firing process described later. There is no particular restriction on the material of the organic pore former insofar as the particle size thereof satisfies the relationship in the foregoing expression (2), examples including a polymer compound such as a water absorbable polymer, starch, or foamable resin, or polymethyl methacrylate (PMMA), coke and the like. The organic pore formers include not only pore formers made mainly of organic substances but also pore formers such as charcoal, coal, and coke, which are dispersed and lost by firing.

The particle size of the cordierite forming raw material can be determined by individually measuring the cumulative particle size distribution of each raw material used as the cordierite forming raw material, and then weighting and averaging from the blending ratio of each raw material using the measurement result of the cumulative particle size distribution of each raw material. More specifically, if a cordierite forming raw material is composed of talc, kaolin, alumina, aluminum hydroxide, and porous silica, then first, for each raw material, $D_{(a)}$ 10, $D_{(a)}$ 50, and $D_{(a)}$ 90 are measured. Then, $D_{(a)}$ 10, $D_{(a)}$ 50, and $D_{(a)}$ 90 of the cordierite forming raw material can be determined by weighting and averaging from the blending ratio of each raw material. The cumulative particle size distribution of each raw material is to be based on the values measured by the laser diffraction/scattering method. For example, the cumulative particle size distribution of each raw material can be measured using a laser diffraction/scattering type particle diameter distribution measurement device (trade name: LA-960) manufactured by HORIBA, Ltd.

The particle size of an organic pore former can also be measured using the foregoing measurement device. If an organic pore former is composed of one type, then $D_{(b)}$ 50 can be determined from measured cumulative particle size distribution. If an organic pore former is composed of two or more types, then $D_{(b)}$ 50 can be determined by weighting and averaging from the blending ratio according to the same method as with a cordierite forming raw material.

There is no particular restriction on a specific $D_{(a)}$ 50 of a cordierite forming raw material, but $D_{(a)}$ 50 is preferably, for example, 1 to 50 µm, more preferably 3 to 30 µm, and particularly preferably 3 to 26 µm. If $D_{(a)}$ 50 of a cordierite forming raw material is in the foregoing numerical range, then the filtration efficiency is advantageously improved.

There is no particular restriction also on the specific $D_{(b)}$ 50 of an organic pore former, but the $D_{(b)}$ 50 is preferably, for example, 5 to 100 µm, more preferably 10 to 50 µm, and particularly preferably 10 to 30 µm. If the $D_{(b)}$ 50 of an organic pore former is in the foregoing numerical range, then the filtration efficiency is advantageously improved.

The theoretical upper limit value of "$D_{(a)}$ 50/($D_{(a)}$ 90−$D_{(a)}$ 10)" of the left side in expression (1) is below 1.00. The substantial upper limit value of the left side in expression (1) is preferably, for example, 0.90 and more preferably 0.80.

There is no particular restriction on the lower limit value of "|$\log_{10} D_{(a)}$ 50−$\log_{10} D_{(b)}$ 50|" of the left side in expression (2). If "$\log_{10} D_{(a)}$ 50" and "$\log_{10} D_{(b)}$ 50" indicate the same value, then the value of the left side in expression (2) will be "0."

There is no particular restriction on the particle diameter of the porous silica. In the cumulative particle size distribution based on volume of the porous silica by the laser diffraction/scattering type particle size distribution measurement method, if the particle diameter (µm) of 50% by volume of the total volume from the small diameter side is denoted by $D_{(c)}$ 50, then the $D_{(c)}$ 50 of the porous silica is preferably 1 to 50 µm and more preferably 3 to 30 µm.

The cordierite forming raw material preferably contains 5 to 18 parts by mass and more preferably 8 to 17 parts by mass of the porous silica in 100 parts by mass of the cordierite forming raw material. If the content ratio of the porous silica is below 5 parts by mass, then the effect of pore forming may become difficult to be exhibited, which is not desirable. If the content ratio of the porous silica exceeds 18 parts by mass, then the thermal expansion coefficient of cordierite increases, which is not desirable in terms of thermal shock resistance.

There is no particular restriction on the addition amount of an organic pore former, and the addition amount can be determined as appropriate according to the porosity or the like of the partition wall of a honeycomb filter to be manufactured. For example, the addition amount of an organic pore former is preferably 0.5 to 5 parts by mass and more preferably 1 to 4 parts by mass for 100 parts by mass of a cordierite forming raw material.

In the kneaded material preparation process, a dispersing medium is added to the cordierite forming raw material and the organic pore former, the particle sizes of which have been adjusted as described above, and then the mixture is blended and kneaded thereby to prepare the kneaded material. The dispersing medium may be, for example, water. When preparing the kneaded material, a binder, a surfactant and the like may be further added.

Examples of the binder include hydroxypropylmethyl cellulose, methyl cellulose, hydroxyethyl cellulose, carboxylmethyl cellulose, polyvinyl alcohol and the like. These may be used by one type alone, or may be used in combination of two or more types. As the surfactant, for example, dextrin, fatty acid soap, polyether polyol and the like can be used. These may be used alone or in combination of two or more.

There is no particular restriction on the method of preparing the kneaded material by blending and kneading a cordierite forming raw material and the like, and examples thereof include a method of blending and kneading by a kneader, a vacuum pugmill or the like.

(2-2) Forming Process

In the forming process, the kneaded material obtained in the kneaded material preparation process is formed into a honeycomb shape to manufacture a honeycomb formed body. There is no particular restriction on the forming method used for forming the kneaded material into a honeycomb shape, and examples thereof include conventionally known forming methods such as extrusion, injection molding, and press molding. Among these forming methods, a method of extruding the kneaded material prepared as described above by using a die corresponding to a desired cell shape, a partition wall thickness, and a cell density can be mentioned as a preferred example.

The honeycomb formed body obtained by the forming process is a pillar-shaped formed body that has a partition wall disposed to surround a plurality of cells that extend from the first end face to the second end face. The honeycomb formed body is fired so as to become the honeycomb structure body 4 in the honeycomb filter 100 shown in FIG. 1 to FIG. 3.

The obtained honeycomb formed body may be dried to obtain a honeycomb dried body from the honeycomb formed body. There is no particular restriction on the drying method, and examples thereof include hot air drying, microwave drying, dielectric drying, reduced-pressure drying, vacuum drying, and freeze drying, and among these, dielectric drying, microwave drying, and hot air drying are preferably performed alone or in combination.

In the forming process, the plugging portions are preferably formed by plugging the open ends of the cells of the honeycomb formed body. The plugging portions can be formed according to a conventional publicly known honeycomb filter manufacturing method. For example, as the method for forming the plugging portions, the following method can be mentioned. First, water and a binder or the like are added to a ceramic raw material to prepare a slurry plugging material. As the ceramic raw material, for example, the cordierite forming raw material or the like used to manufacture the honeycomb formed body can be used. Then, the plugging material is filled into the open ends of predetermined cells from the first end face side of the honeycomb formed body. When filling the plugging material into the open ends of the predetermined cells, preferably, for example, the first end face of the honeycomb formed body is provided with a mask to close the open ends of the remaining cells other than the predetermined cells, and the plugging material is selectively filled into the open ends of the predetermined cells. At this time, the slurry plugging material may be stored in a storage container, and the first end face side of the honeycomb formed body provided with the mask may be immersed in the storage container to fill the plugging material. Then, the plugging material is filled into the open ends of the remaining cells other than the predetermined cells from the second end face side of the honeycomb formed body. As the method for filling the plugging material, the same method as that for the predetermined cells described above can be used. The plugging portions may be formed before drying the honeycomb formed body or after drying the honeycomb formed body.

(2-3) Firing Process

The firing process is a process for firing the honeycomb formed body obtained in the forming process thereby to obtain a honeycomb filter. The temperature of a firing atmosphere for firing a honeycomb formed body is preferably, for example, 1300 to 1450° C., and more preferably 1400 to 1450° C. Further, the firing time is preferably set to 2 to 8 hours as the time for keeping a maximum temperature.

There is no particular restriction on the specific method of firing a honeycomb formed body, and a firing method in a conventional publicly known honeycomb filter manufacturing method can be applied. For example, the firing method can be implemented using an existing continuous firing furnace (e.g., tunnel kiln) or a batch firing furnace (e.g., shuttle kiln), which is provided with a charge port at one end and a discharge port at the other end of a firing path.

EXAMPLES

The following will describe in more detail the present invention by examples, but the present invention is not at all limited by the examples.

Example 1

For the cordierite forming raw material, talc, kaolin, alumina, aluminum hydroxide, and porous silica were prepared. Then, the cumulative particle size distribution of each raw material was measured using the laser diffraction/scattering type particle diameter distribution measurement device (trade name: LA-960) manufactured by HORIBA, Ltd. In Example 1, the raw materials were blended to prepare the cordierite forming raw materials such that the blending ratios (parts by mass) of the raw materials exhibited the values shown in Table 1. In Table 1, the horizontal row of "Particle size D50 (μm)" shows the particle diameter of 50% by volume (i.e., a median diameter) of each raw material. A porous silica having a BET specific surface area of 200 to 400 m$^2$/g measured in accordance with JIS-R1626 was used.

Next, 1.5 parts by mass of a water absorbable polymer as an organic pore former, 6.0 parts by mass of a binder, 1 part by mass of a surfactant, and 57 parts by mass of water were added to 100 parts by mass of a cordierite forming raw material to prepare a kneaded material. As the water absorbable polymer, a polymer, the particle diameter of 50% by volume of which was 10 μm, was used. Table 2 shows the blending ratio (parts by mass) of the organic pore formers and other raw materials. In Table 2, the horizontal row of "Particle size D50 (μm)" shows the particle diameter of 50% by volume (i.e., the median diameter) of the organic pore formers. Further, the blending ratio (parts by mass) shown in Table 2 shows the ratio with respect to 100 parts by mass of the cordierite forming raw material.

From the measurement results of the cumulative particle size distribution of each raw material used as the cordierite forming raw material, $D_{(a)}$ 10, $D_{(a)}$ 50, and $D_{(a)}$ 90 as the cordierite forming raw material were calculated. The results are shown in Table 3. The calculation of $D_{(a)}$ 10, $D_{(a)}$ 50, and $D_{(a)}$ 90 was performed by weighting and averaging the blending ratio of each raw material. Further, the values of $D_{(b)}$ 50 of the organic pore formers are shown in Table 3. From the values shown in Table 3, the values of the left sides of expression (1) and expression (2) described above were calculated. The results are shown in Table 3. In Table 3, the column of "Value of expression (1)" shows the values of "$D_{(a)}$ 50/$D_{(a)}$ 90−$D_{(a)}$ 10," and the column of "Value of expression (2)" shows the values of "$|\log_{10} D_{(a)} 50 - \log_{10} D_{(b)} 50|$."

TABLE 1

| | \multicolumn{11}{c|}{Blending ratio of cordierite forming raw material (parts by mass)} |
|---|---|---|---|---|---|---|---|---|---|---|---|
| | Talc | Kaolin | Alumina | Aluminum hydroxide | Fused silica | | Porous silica | | | | |
| Particle size D50 (μm) | 10 | 20 | 5 | 5 | 6 | 3 | 25 | 5 | 10 | 13 | 20 |
| Example 1 | 40 | — | 19 | 14 | — | 15 | — | — | 12 | — | — |
| Example 2 | 40 | — | 19 | 14 | — | 15 | — | 12 | — | — | — |
| Example 3 | 40 | — | 19 | 14 | — | 15 | — | — | — | 12 | — |
| Example 4 | 40 | — | 19 | 14 | — | 15 | — | — | — | 12 | — |
| Example 5 | 40 | — | 8 | 17 | — | 18 | — | — | 17 | — | — |
| Comparative Example 1 | 20 | 20 | 19 | — | 14 | 15 | 12 | — | — | — | — |
| Comparative Example 2 | 40 | — | 19 | 14 | — | 15 | — | — | — | — | 12 |
| Comparative Example 3 | 40 | — | 19 | 14 | — | 15 | — | 12 | — | — | — |

TABLE 2

| | Blending ratio of organic pore former (parts by mass) | | | Blending ratio of other raw materials (parts by mass) | | |
|---|---|---|---|---|---|---|
| Material | Water absorbable polymer | | | Binder | Surfactant | Water |
| Particle size D50 (μm) | 10 | 25 | 30 | — | — | — |
| Example 1 | 1.5 | — | — | 6.0 | 1 | 57 |
| Example 2 | 4.0 | — | — | 6.0 | 1 | 72 |
| Example 3 | 1.5 | — | — | 6.0 | 1 | 57 |
| Example 4 | 3.0 | — | — | 6.0 | 1 | 77 |
| Example 5 | 0.5 | — | — | 6.0 | 1 | 55 |
| Comparative Example 1 | — | — | 1.0 | 6.0 | 1 | 32 |

TABLE 2-continued

| Material | Blending ratio of organic pore former (parts by mass) | | Blending ratio of other raw materials (parts by mass) | | |
|---|---|---|---|---|---|
| | Water absorbable polymer | | Binder | Surfactant | Water |
| Comparative Example 2 | 1.5 | — | — | 6.0 | 1 | 57 |
| Comparative Example 3 | — | 4.0 | — | 6.0 | 1 | 72 |

TABLE 3

| | Cordierite forming raw material | | | | Organic pore former | |
|---|---|---|---|---|---|---|
| | $D_{(a)}10$ (μm) | $D_{(a)}50$ (μm) | $D_{(a)}90$ (μm) | Value of Expression (1) [*1] | $D_{(b)}50$ (μm) | Value of Expression (2) [*2] |
| Example 1 | 2.7 | 7.7 | 15.4 | 0.61 | 10.0 | 0.12 |
| Example 2 | 2.5 | 6.3 | 14.9 | 0.51 | 10.0 | 0.20 |
| Example 3 | 2.7 | 7.9 | 16.8 | 0.56 | 10.0 | 0.10 |
| Example 4 | 2.7 | 7.9 | 16.8 | 0.56 | 10.0 | 0.10 |
| Example 5 | 2.9 | 7.7 | 14.9 | 0.64 | 10.0 | 0.11 |
| Comparative Example 1 | 2.7 | 9.2 | 29.1 | 0.35 | 30.0 | 0.51 |
| Comparative Example 2 | 2.7 | 8.0 | 19.7 | 0.47 | 10.0 | 0.10 |
| Comparative Example 3 | 2.5 | 6.3 | 14.9 | 0.51 | 25.0 | 0.60 |

[*1] Value of Expression (1) denotes "$D_{(a)}50/(D_{(a)}90 - D_{(a)}10)$"
[*2] Value of Expression (2) denotes "$|\log_{10} D_{(a)}50 - \log_{10} D_{(b)}50|$"

Next, the obtained kneaded material was molded using a continuous extrusion molding machine to manufacture a honeycomb formed body. Next, plugging portions were formed on the obtained honeycomb formed body. First, a mask was applied to the first end face of the honeycomb formed body so as to close the open ends of the remaining cells other than the predetermined cells. Next, the masked end portion (the end portion on the first end face side) was immersed in a slurry plugging material to fill the open ends of the predetermined cells, which were not masked, with the plugging material. Thereafter, a mask was applied to the second end face of the honeycomb formed body so as to close the open ends of the predetermined cells, and the open ends of the remaining cells other than the predetermined cells were filled with the plugging material in the same manner as described above.

Next, the honeycomb formed body with the plugging portions formed therein was fired such that the maximum temperature was 1420° C., thereby manufacturing the honeycomb filter of Example 1.

The honeycomb filter of Example 1 had an end face diameter of 132 mm and a length of 102 mm in the extending direction of the cells. The cell shape in the cross section orthogonal to the extending direction of the cells was quadrangular. The partition wall thickness of the honeycomb filter was 203 μm, and the cell density was 31.0 cells/cm². Table 4 shows the partition wall thickness (μm) and the cell density (cells/cm²) of the honeycomb filter.

On the honeycomb filter of Example 1, the porosity and the average pore diameter of the partition wall were measured. The results are shown in Table 4. The porosity and the average pore diameter were measured using Autopore IV (trade name) manufactured by Micromeritics. A part of the partition wall was cut out from the honeycomb filter to obtain a test piece, and the porosity was measured using the obtained test piece. The test piece was a rectangular parallelepiped having a length, a width, and a height of approximately 10 mm, approximately 10 mm, and approximately 20 mm, respectively. The sampling location of the test piece was set in the vicinity of the center of the honeycomb structure body in the axial direction. When determining the porosity and the average pore diameter, the true density of cordierite was set to 2.52 g/cm³.

Further, the cumulative pore volumes of the partition wall of the honeycomb filter of Example 1 were measured, and based on the measurement results, pore diameter distributions which indicates log pore diameters (μm) on the horizontal axis and log differential pore volumes (cm3/g) on the vertical axis were created. Then, in the created pore diameter distributions, the half-value widths of the first peaks that included the maximum values of the log differential pore volumes were determined. The results are shown in Table 4.

On the honeycomb filter of Example 1, the number per mm² of pores which exist at the surface of the partition wall and which have equivalent circle diameters exceeding 3.0 μm was measured. The measurement method is as described below. First, a sample for measurement was cut out from the honeycomb structure body such that the surface of the partition wall of the honeycomb structure body of the honeycomb filter of Example 1 could be observed. Then, the surface of the partition wall of the sample for measurement was photographed by a laser microscope. As the laser microscope, a shape analysis laser microscope of "VK X250/260 (trade name)" manufactured by KEYENCE Corporation was used. In the photographing of the surface of the partition wall, the magnification was set to 240 times, and arbitrary places of 10 fields of view were photographed. Image processing was performed on the captured images, and the number of pores in the surface of the partition wall was calculated. In the image processing, an area was selected so as not to include a partition wall portion other than the surface of the partition wall, and the inclination of the surface of the partition wall was corrected to horizontal. After that, the upper limit of the height for being recognized as pores was changed to −3.0 μm from the reference surface, and the numbers of pores of the captured images were calculated by image processing software under a condition that pores having equivalent circle diameters of 3.0 μm or less were ignored. The values of the numbers of pores (pores/mm$^2$) of the surface of the partition wall were the average values of the measurement results of the 10 fields of view. As the image processing software, "VK-X (trade name)" included with the shape analysis laser microscope of "VK X250/260 (trade name)" manufactured by KEYENCE Corporation was used. The measurement results are shown in Table 4. In Table 4, the column of "Number of pores (pores/mm$^2$) shows the number per mm$^2$ of pores which exist at the surface of the partition wall and which have equivalent circle diameters exceeding 3.0 μm.

On the honeycomb filter of Example 1, the filtration efficiency and the pressure loss were evaluated according to the method described below. Further, based on the evaluation results of the filtration efficiency and the pressure loss, comprehensive evaluation was performed on the basis of the evaluation standard described below. The results are shown in Table 4.

(Filtration Efficiency)

First, exhaust gas purification devices were fabricated by using the honeycomb filters of the examples and the comparative examples as the exhaust gas purifying filters. Then, each of the fabricated exhaust gas purification devices was connected to an outlet side of an engine exhaust manifold of a 1.2 L direct injection type gasoline engine vehicle, and the number of soot particles contained in the gas emitted from the outlet port of the exhaust gas purification device was measured by a PN measurement method. As for the driving mode, a driving mode (RTS95) that simulates the worst of RDE driving was implemented. The total number of soot particles emitted after the driving in the mode was taken as the number of soot particles of the exhaust gas purification device to be evaluated, and the filtration efficiency (%) was calculated from the number of soot particles. Based on the value of the calculated filtration efficiency (%), the evaluation was performed according to the following evaluation standard.

(Evaluation Standard)

Evaluation "Excellent": The filtration efficiency is 90% or more and 100% or less.

Evaluation "Good": The filtration efficiency is 85% or more and below 90%.

Evaluation "Acceptable": The filtration efficiency is 80% or more and below 85%.

Evaluation "Fail": The filtration efficiency is below 80%.

(Pressure Loss)

The pressure loss (kPa) of each of the honeycomb filters was measured using a large wind tunnel tester. The measurement conditions for the pressure loss were a gas temperature of 25° C. and a gas flow rate of 10 Nm$^3$/min. Based on the measured pressure loss (kPa) values, evaluation was performed according to the following evaluation standard.

(Evaluation Standard)

Evaluation "Excellent": The pressure loss is 3.0 kPa or less.

Evaluation "Good": The pressure loss exceeds 3.0 kPa and is 3.6 kPa or less.

Evaluation "Acceptable": The pressure loss exceeds 3.6 kPa and is 4.2 kPa or less.

Evaluation "Fail": The pressure loss exceeds 4.2 kPa.

(Comprehensive Evaluation)

Evaluation "Excellent": The evaluation results of both filtration efficiency and pressure loss are "Excellent."

Evaluation "Good": The evaluation results of both filtration efficiency and pressure loss are "Good" or higher (except a case where the comprehensive evaluation is "Excellent").

Evaluation "Acceptable": The evaluation results of both filtration efficiency and pressure loss are "Acceptable" or higher (except cases where the comprehensive evaluations are "Excellent" and "Good").

Evaluation "Fail": The evaluation results of the filtration efficiency and the pressure loss include "Fail."

TABLE 4

| | Results related to characteristics | | | | | | | | |
|---|---|---|---|---|---|---|---|---|---|
| | Structure | | | Characteristics of pore | | | | | |
| | Partition wall | Cell | | Average | Half-value | Number of | Evaluation item | | |
| | thickness (μm) | density (cells/cm$^2$) | Porosity (%) | pore dia. (μm) | width (—) of 1st peak | pores (pores/mm$^2$) | Filtration efficiency | Pressure loss | Comprehensive Evaluation |
| Example 1 | 203 | 31.0 | 57.0 | 6.4 | 0.121 | 2332 | Excellent | Good | Good |
| Example 2 | 229 | 31.0 | 60.1 | 6.8 | 0.151 | 2111 | Excellent | Good | Good |
| Example 3 | 203 | 31.0 | 56.9 | 7.9 | 0.226 | 1566 | Excellent | Excellent | Excellent |
| Example 4 | 203 | 31.0 | 61.1 | 8.2 | 0.215 | 1480 | Good | Good | Good |
| Example 5 | 229 | 31.0 | 55.5 | 6.0 | 0.061 | 1931 | Excellent | Acceptable | Good |
| Comparative Example 1 | 229 | 31.0 | 48.3 | 12.8 | 0.372 | 693 | Fail | Acceptable | Fail |
| Comparative Example 2 | 203 | 31.0 | 53.1 | 7.8 | 0.350 | 1390 | Excellent | Fail | Fail |
| Comparative Example 3 | 203 | 31.0 | 62.4 | 10.8 | 0.363 | 1284 | Good | Acceptable | Acceptable |

Examples 2 to 5

In Examples 2 to 5, the blending ratios (parts by mass) of the raw materials used for the cordierite forming raw material were changed as shown in Table 1. In addition, the blending ratios (parts by mass) of the organic pore former and other raw materials were also changed as shown in Table 2. Except that these raw materials were used to prepare the kneaded material, the honeycomb filters were manufactured by the same method as that of Example 1.

Comparative Examples 1 to 3

In Comparative examples 1 to 3, the blending ratios (parts by mass) of the raw materials used for the cordierite forming raw material were changed as shown in Table 1. In addition, the blending ratios (parts by mass) of the organic pore former and other raw materials were also changed as shown in Table 2. Except that these raw materials were used to prepare the kneaded material, the honeycomb filters were manufactured by the same method as that of Example 1.

On the honeycomb filters of Examples 2 to 5 and Comparative Examples 1 to 3, the filtration efficiency and the pressure loss were evaluated by the same method as that of Example 1. Further, based on the evaluation results of the filtration efficiency and the pressure loss, the comprehensive evaluation was performed according to the foregoing evaluation standard. The results are shown in Table 4.

(Results)

Regarding the honeycomb filters of Examples 1 to 5, the evaluation results of the filtration efficiency and the pressure loss were both "Acceptable" or higher, and the comprehensive evaluations thereof also showed good results. On the other hand, the honeycomb filters of Comparative Examples 1 to 3 exhibited inferior evaluation results of the filtration efficiency and the pressure loss in comparison with the honeycomb filters of Examples 1 to 5.

INDUSTRIAL APPLICABILITY

The honeycomb filter according to the present invention can be used as a trapping filter for removing particulates and the like contained in exhaust gas.

DESCRIPTION OF REFERENCE NUMERALS

1: partition wall; 2: cell; 2a: inflow cell; 2b: outflow cell; 3: circumferential wall; 4: honeycomb structure body; 5: plugging portion; 11: first end face; 12: second end face; and 100: honeycomb filter.

What is claimed is:

1. A honeycomb filter comprising:
   a pillar-shaped honeycomb structure body having a porous partition wall disposed to surround a plurality of cells which serve as fluid through channels extending from a first end face to a second end face; and
   a plugging portion provided at an open end on a side of the first end face or a side of the second end face of each of the plurality of cells,
   wherein the porous partition wall is composed of a material containing cordierite as a main component thereof,
   a number per unit area of pores which exist at a surface of the porous partition wall and which have equivalent circle diameters exceeding 3.0 µm is 1400 per $mm^2$ or more,
   in a pore diameter distribution which indicates a cumulative pore volume of the porous partition wall, with a log pore diameter on a horizontal axis and a log differential pore volume ($cm^3/g$) on a vertical axis, a half-value width of a first peak that includes a maximum value of the log differential pore volume is 0.30 or less,
   a porosity of the porous partition wall is 55 to 63%, and
   an average pore diameter of the porous partition wall is 5 to 15 µm.

2. The honeycomb filter according to claim 1, wherein a thickness of the porous partition wall is 152 to 254 µm.

* * * * *